United States Patent
Gerami et al.

(10) Patent No.: US 12,432,710 B2
(45) Date of Patent: Sep. 30, 2025

(54) SYSTEMS AND METHODS FOR TRANSMITTING A SEMI-PERSISTENT SCHEDULING (SPS) RELEASE COMMAND TO A USER EQUIPMENT (UE)

(71) Applicant: Telefonaktiebolaget LM Ericsson (publ), Stockholm (SE)

(72) Inventors: Majid Gerami, Lund (SE); Bikramjit Singh, Raasepori (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 439 days.

(21) Appl. No.: 17/917,830

(22) PCT Filed: Apr. 9, 2021

(86) PCT No.: PCT/EP2021/059334
§ 371 (c)(1),
(2) Date: Oct. 7, 2022

(87) PCT Pub. No.: WO2021/205018
PCT Pub. Date: Oct. 14, 2021

(65) Prior Publication Data
US 2023/0164761 A1    May 25, 2023

Related U.S. Application Data

(60) Provisional application No. 63/008,304, filed on Apr. 10, 2020.

(51) Int. Cl.
*H04W 72/11* (2023.01)
*H04L 1/1812* (2023.01)
(Continued)

(52) U.S. Cl.
CPC .......... *H04W 72/11* (2023.01); *H04L 1/1812* (2013.01); *H04W 72/1273* (2013.01); *H04W 76/30* (2018.02)

(58) Field of Classification Search
CPC . H04W 72/11; H04W 76/30; H04W 72/1273; H04W 52/0209; H04W 68/00;
(Continued)

(56) References Cited

U.S. PATENT DOCUMENTS

| | | | |
|---|---|---|---|
| 2020/0313809 A1* | 10/2020 | Park | H04L 1/1861 |
| 2021/0037463 A1* | 2/2021 | Ahn | H04W 72/20 |
| 2021/0037516 A1* | 2/2021 | Lyu | H04W 72/54 |

FOREIGN PATENT DOCUMENTS

| | | |
|---|---|---|
| EP | 3 568 938 B1 | 3/2021 |
| WO | 2018/131937 A8 | 7/2018 |

OTHER PUBLICATIONS

WO 2019156515 A1 (Year: 2019).*
(Continued)

*Primary Examiner* — Rushil P. Sampat
(74) *Attorney, Agent, or Firm* — Rothwell, Figg, Ernst & Manbeck, P.C.

(57) ABSTRACT

A method (700) performed by abase station. The method includes transmitting (s702) configuration information to a user equipment, UE, the configuration information for configuring the UE for semi-persistent scheduling, SPS. The method also includes transmitting (s704) an SPS activation command for activating the configured SPS. The method also includes determining (s706) whether the UE is capable to receive a) an SPS release command for releasing the configured SPS and b) a physical downlink shared channel, PDSCH, transmission for the configured SPS in the same slot. The method also includes, after determining that the UE is capable to receive a) the SPS release command for releasing the configured SPS and b) the PDSCH transmission for the configured SPS in the same slot, transmitting (s708) the SPS release command in a slot in which the UE expects to receive the PDSCH transmission for the configured SPS.

18 Claims, 10 Drawing Sheets

(51) Int. Cl.
*H04W 72/1273* (2023.01)
*H04W 76/30* (2018.01)

(58) Field of Classification Search
CPC ......... H04W 52/0216; H04W 72/0406; H04W 72/20; H04W 72/23; H04W 52/0229; H04L 1/1812; Y02D 30/70
See application file for complete search history.

(56) References Cited

OTHER PUBLICATIONS

International Search Report and Written Opinion issued in International Application No. PCT/EP2021/059334 dated Apr. 9, 2021 (13 pages).
LG Electronics, "Outcome of email thread [100e-NR-L1enh_URLLC-SPS_enh-02]", 3GPP TSG RAN WG1 #100, R1-2001383, e-Meeting, Feb. 24-Mar. 6, 2020 (12 pages).
NTT DOCOMO, INC., "Remaining issues on HARQ-ACK codebook and CA", 3GPP TSG RAN WG1 Meeting #92bis, R1-1805059, Sanya, China, Apr. 16-20, 2018 (8 pages).
LG Electronics, "Outcome of email thread [100e-NR-L1enh_URLLC-SPS_enh-01]", 3GPP TSG RAN WG1 #100, R1-2001382, e-Meeting, Feb. 24-Mar. 6, 2020 (12 pages).
Ericsson, "Remaining Issue for NR URLLC", 3GPP TSG-RAN WG1 Meeting #100bis, Tdoc R1-2001790, e-Meeting, Apr. 20-30, 2020 (6 pages).
3GPP TS 38.213 V16.1.0 (Mar. 2020), 3rd Generation Partnership Project; Technical Specification Group Radio Access Network; NR; Physical layer procedures for control (Release 16), Mar. 2020 (156 pages).

* cited by examiner

SYSTEMS AND METHODS FOR TRANSMITTING A SEMI-PERSISTENT SCHEDULING (SPS) RELEASE COMMAND TO A USER EQUIPMENT (UE)

CROSS REFERENCE TO RELATED APPLICATIONS

This application is a 35 U.S.C. § 371 National Stage of International Patent Application No. PCT/EP2021/059334, filed 2021 Apr. 9, which claims priority to U.S. provisional patent application No. 63/008,304, filed on 2020 Apr. 10. The above identified applications are incorporated by this reference.

TECHNICAL FIELD

Disclosed are embodiments related to semi-persistent scheduling (SPS), and specifically the interaction between an SPS release and a physical downlink shared channel (PDSCH) transmission related to the SPS.

BACKGROUND

The SPS feature was originally designed to reduce control channel overhead for voice-over Internet Protocol (VoIP) based services because VoIP services require persistent radio resource allocation at regular interval (e.g., one packet in 20 ms from AMR speech codec). To support large number of VoIP calls there is huge overhead on control signaling. VoIP periodically generates small sized packets at short and regular intervals. To avoid lot of downlink assignment and uplink grant, the SPS feature significantly reduces heavy load on the Physical Downlink Control Channel (PDCCH) by doing minimum downlink assignment and uplink grant. SPS allocates radio resources for a long period of time.

In the downlink, SPS is supported where the user equipment (UE) is configured with a periodicity of the data transmissions using Radio Resource Control (RRC) signaling. Activation of semi-persistent scheduling is done using the PDCCH as for dynamic scheduling but with the CS-RNTI instead of the normal C-RNTI. The PDCCH also carries the necessary information in terms of time-frequency resources and other parameters needed in a similar way as dynamic scheduling. The hybrid automatic repeat request (HARD) process number is derived from the time when the downlink data transmission starts according to a formula. Upon activation of SPS, the UE receives downlink data transmission periodically according to the RRC-configured periodicity using the transmission parameters indicated on the PDCCH activating the transmission. Hence, control signaling is only used once and the overhead is reduced. After enabling semi-persistent scheduling, the UE continues to monitor the set of candidates PDCCHs for uplink and downlink scheduling commands. This is useful in the case that there are occasional transmissions of large amounts of data for which the semi-persistent allocation is not sufficient. It is also used to handle HARQ retransmissions which are dynamically scheduled.

HARQ-ACK for DL-SPS in the Current 3GPP Specifications

Section 5.1 of 3GPP TS 38.214 V16.1.0 ("TS 38.214") States:

---

If more than one PDSCH on a serving cell each without a corresponding PDCCH transmission are partially or fully overlapping in time, a UE is not required to receive a PDSCH among these PDSCHs other than one with the lowest configured sps-ConfigIndex.
If a UE does not indicate a capability to receive more than one unicast PDSCH per slot, and if there is more than one PDSCH on a serving cell each without a corresponding PDCCH transmission in a slot, the UE is not required to receive a PDSCH among these PDSCHs other than one with the lowest configured sps-ConfigIndex on the serving cell.

---

Section 5.1.2.1 of TS 38.214 States:

---

When receiving PDSCH scheduled by DCI format 1_1 or 1_2 in PDCCH with CRC scrambled by C-RNTI, MCS-C-RNTI, or CS-RNTI with NDI=1, if the UE is configured with pdsch-AggregationFactor in pdsch-config, the same symbol allocation is applied across the pdsch-AggregationFactor consecutive slots. When receiving PDSCH scheduled by DCI format 1_1 or 1_2 in PDCCH with CRC scrambled by CS-RNTI with NDI=0, or PDSCH scheduled without corresponding PDCCH transmission using sps-Config and activated by DCI format 1_1 or 1_2, the same symbol allocation is applied across the pdsch-AggregationFactor, in sps-Config if configured or in pdsch-config otherwise, consecutive slots. The UE may expect that the TB is repeated within each symbol allocation among each of the pdsch-AggregationFactor consecutive slots and the PDSCH is limited to a single transmission layer. For PDSCH scheduled by DCI format 1_1 or 1_2 in PDCCH with CRC scrambled by CS-RNTI with NDI=0, or PDSCH scheduled without corresponding PDCCH transmission using sps-Config and activated by DCI format 1_1 or 1_2, the UE is not expected to be configured with the time duration for the reception of pdsch-AggregationFactor repetitions, in sps-Config if configured or in pdsch-config otherwise, larger than the time duration derived by the periodicity P obtained from the corresponding sps-Config. The redundancy version to be applied on the nth transmission occasion of the TB, where n = 0, 1, ...pdsch-AggregationFactor -1, is determined according to table 5.1.2.1-2 and "rvid indicated by the DCI scheduling the PDSCH" in table 5.1.2.1-2 is assumed to be 0 for PDSCH scheduled without corresponding PDCCH transmission using sps-Config and activated by DCI format 1_1 or 1_2.

Section 9.1.2.1 of 3GPP TS 38.213 V16.1.0 ("TS 28.213") States:

...
if the UE does not indicate a capability to receive more than one unicast PDSCH per slot and
R ≠ ∅
$M_{A,c} = M_{A,c} Y j$ ;
$j = j + 1$ ;
The UE does not expect to receive SPS PDSCH release and unicast PDSCH in a same slot;
...
If the UE indicates a capability to receive more than one PDSCH per slot, for occasions of candidate PDSCH receptions corresponding to rows of R associated with a same value of $b_{r,k,n_D}$
,
where $b_{r,k,n_D} \in B$ , the UE does not expect to receive more than one PDSCH in a same DL slot.
...
If a UE receives a SPS PDSCH, or a SPS PDSCH release, or a PDSCH that is scheduled by a DCI format 1_0 and if
  - the UE is configured with one serving cell, and
  - $\ell(M_{A,c}) = 1$, and
  - PDSCH-CodeBlockGroupTransmission is provided to the UE
the UE generates HARQ-ACK information only for the transport block in the PDSCH or only for the SPS PDSCH release.

In release 16 (Rel-16), downlink SPS (DL-SPS) can have a periodicity of one slot (one slot equals 14 OFDM symbols). The 5G base station (gNB) sends DL SPS release in the Downlink Control Information (DCI) to a UE to release a DL-SPS configuration. The UE sends HARQ ACK for DL SPS release DCI.

SUMMARY

Certain challenges presently exist. In Rel-15, the UE does not expect to receive SPS PDSCH release and unicast PDSCH in the same slot. In Rel-15, the periodicity of SPS is 10 ms, thus in order to release SPS, gNB can send SPS-release when there is no SPS PDSCH allocated. Now In Rel-16, a UE can be configured for DL-SPS PDSCH with one-slot periodicity. Hence there will be no slot without a PDSCH where gNB can send an SPS release command.

Accordingly, on one aspect there is provided a method performed by a base station, were the method includes transmitting configuration information to a user equipment, UE, the configuration information for configuring the UE for semi-persistent scheduling, SPS. The method also includes transmitting an SPS activation command for activating the configured SPS. The method also includes determining whether the UE is capable to receive both a) an SPS release command for releasing the configured SPS and b) a PDSCH transmission in the same slot. The method also includes after determining that the UE is capable to receive both a) an SPS release command for releasing the configured SPS and b) a PDSCH transmission in the same slot, transmitting the SPS release command in a slot in which the UE is expected to receive the PDSCH transmission.

In another aspect there is provided a computer program comprising instructions which when executed by processing circuitry of a base station causes the base station to perform the method. In another aspect there is provided a carrier containing the computer program, wherein the carrier is one of an electronic signal, an optical signal, a radio signal, and a computer readable storage medium.

In another aspect there is provided a base station, where the base station is configured to perform the method. In some embodiments, the base station includes processing circuitry and a memory containing instructions executable by the processing circuitry, whereby the base station is configured to perform the method.

In another aspect there is provided a method performed by a UE. The method includes the UE receiving information transmitted by a base station, wherein the information configures the UE to expect to receive a PDSCH transmission in a particular slot. The method also includes, during the particular slot, the UE decoding an SPS release command transmitted by the base station, the SPS release command for releasing an active configured SPS.

In another embodiment the method performed by the UE includes the UE indicating a capability to receive a semi-persistent scheduling (SPS) release command in a slot in which the UE is configured to receive a PDSCH transmission. The method also includes the UE receiving an SPS release command in a slot in which the UE is configured to receive a PDSCH transmission.

In another aspect there is provided a computer program comprising instructions which when executed by processing circuitry of a UE causes the UE to perform any one of the UE methods disclosed herein. In another aspect there is provided a carrier containing the computer program, wherein the carrier is one of an electronic signal, an optical signal, a radio signal, and a computer readable storage medium.

In another aspect there is provided a UE, where the UE is configured to perform any one of the UE methods disclosed herein. In some embodiments, the UE includes processing circuitry and a memory containing instructions executable by the processing circuitry, whereby the UE is configured to perform any one of the UE methods disclosed herein.

Accordingly, this disclosure describes a solution such that and SPS PDSCH that is configured with a one-slot periodicity can be released. The advantage is that DL-SPS PDSCH can be released even if it is configured by one-slot periodicity.

BRIEF DESCRIPTION OF THE DRAWINGS

The accompanying drawings, which are incorporated herein and form part of the specification, illustrate various embodiments.

DETAILED DESCRIPTION

Figure 1:
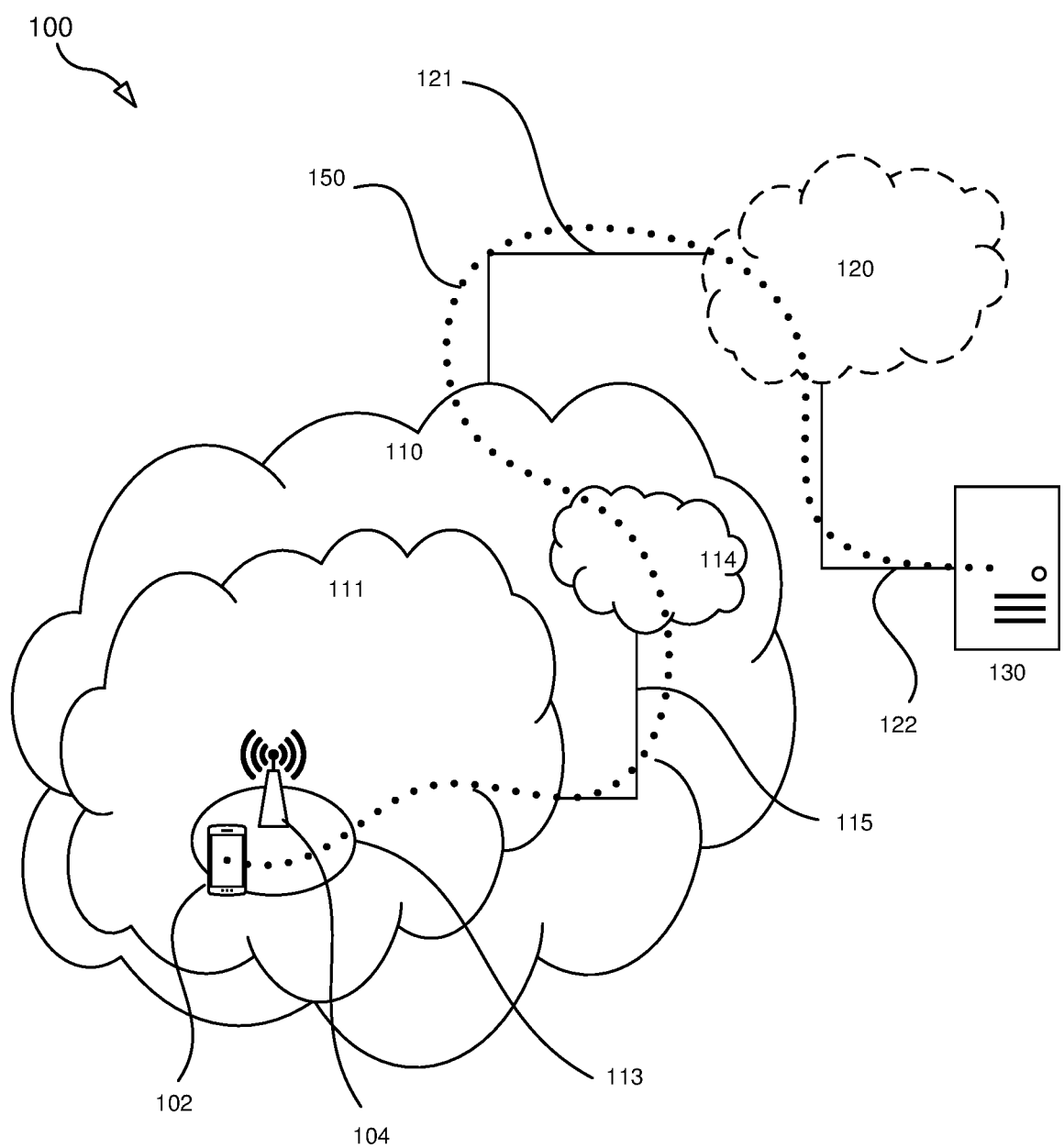
FIG. 1 illustrates a system according to an example embodiment.

FIG. 1 illustrates a telecommunication network 110 connected via an intermediate network 120 to a host computer 130 in accordance with some embodiments. With reference to FIG. 1, in accordance with an embodiment, a communication system 100 includes telecommunication network 110, such as a 3GPP-type cellular network, which comprises access network 111, such as a radio access network, and core network 114. Access network 111 comprises an access point (AP) 104 (a.k.a., base station), such as NB, eNB, gNB or other types of wireless access points, defining a corresponding coverage area 113. AP 104 is connectable to core network 114 over a wired or wireless connection 115. A UE 102 located in coverage area 113 is configured to wirelessly connect to, or be paged by, the corresponding base station 104. While only a single UE 102 and a single AP 104 are illustrated in this example, the disclosed embodiments are equally applicable to a situation where network 110 includes a plurality of APs and/or a plurality of UEs.

Telecommunication network 110 is itself connected to host computer 130, which may be embodied in the hardware and/or software of a standalone server, a cloud-implemented server, a distributed server or as processing resources in a server farm. Host computer 130 may be under the ownership or control of a service provider, or may be operated by the service provider or on behalf of the service provider. Connections 121 and 122 between telecommunication network 110 and host computer 130 may extend directly from core network 114 to host computer 130 or may go via an optional intermediate network 120. Intermediate network 120 may be one of, or a combination of more than one of, a public, private or hosted network; intermediate network 120, if any, may be a backbone network or the Internet; in particular, intermediate network 120 may comprise two or more sub-networks (not shown).

The communication system of FIG. 1 as a whole enables connectivity between the UE 102 and host computer 130. The connectivity may be described as an over-the-top (OTT) connection 150. Host computer 130 and the connected UE 102 are configured to communicate data and/or signaling via OTT connection 150, using access network 111, core network 114, any intermediate network 120 and possible further infrastructure (not shown) as intermediaries. OTT connection 150 may be transparent in the sense that the participating communication devices through which OTT connection 150 passes are unaware of routing of uplink and downlink communications. For example, base station 104 may not or need not be informed about the past routing of an incoming downlink communication with data originating from host computer 130 to be forwarded (e.g., handed over) to a connected UE 102. Similarly, base station 104 need not be aware of the future routing of an outgoing uplink communication originating from the UE 102 towards the host computer 130.

SPS Release and Unicast PDSCH Transmission

Embodiment 1

A UE can expect to receive semi-persistent scheduling (SPS) release and unicast physical downlink shared channel (PDSCH) in a same slot. That is, this disclosure proposes changing Section 9.1.2.1 of TS 38.213 so that it states:

...
if the UE does not indicate a capability to receive more than one unicast PDSCH per slot and
R ≠ Ø
$M_{A,c} = M_{A,c} Y j$ ;
$j = j + 1$ ;
The UE can receive SPS PDSCH release and unicast PDSCH in a same slot;
...

Embodiment 2

The UE can expect to receive SPS release and unicast PDSCH in a same sub-slot.

Embodiment 3

The UE can expect to receive SPS release and unicast PDSCH in different sub-slots of the same slot.

Embodiment 4

The UE can expect to receive SPS release before the end of unicast PDSCH in a same slot. Two different options can occur: 1) The end of the SPS release DCI should come before or at the end of PDSCH, or 2) The beginning of SPS release DCI come before or at the end of PDSCH.

Embodiment 5

In one embodiment, in a same slot where UE can expect an SPS release DCI and unicast PDSCH, the SPS release DCI should come at least x time-units before a hybrid automatice repeat request (HARQ) acknowledge (ACK) (HARQ-ACK) codebook (meant for this unicast PDSCH) so that this HARQ-ACK codebook can be used to acknowledge SPS release. If SPS release DCI comes after x time-units, then this HARQ-ACK codebook cannot be used to acknowledge SPS release, and UE can acknowledge unicast PDSCH in the HARQ-ACK codebook. The x time-units can be thought of required processing time for SPS release DCI.

HARQ-ACK Procedure

Embodiment 6

UE reports HARQ-ACK for a corresponding received SPS release, where UE expects to receive SPS release and unicast PDSCH in a same slot (higher priority for SPS PDSCH release).

Embodiment 7

UE reports HARQ-ACK for a corresponding received SPS release, where UE expects to receive SPS release and unicast PDSCH in a same slot (higher priority for SPS PDSCH release), but 1) the end SPS release DCI must come before or at the end of PDSCH, or 2) the beginning of SPS release DCI must come before or at the end of PDSCH.

Embodiment 8

(a) If SPS release DCI ends after the end of unicast PDSCH or (b) if SPS release DCI begins after the end of unicast PDSCH, then HARQ-ACK for SPS release can be sent in HARQ-ACK codebook which is meant for a subsequent unicast PDSCH (e.g., the next unicast PDSCH). This next PDSCH can be allocated in the next slot (in case with unit periodicity SPS), or after n slots (SPS periodicity with n slots).

Embodiment 9

UE reports HARQ-ACK for a corresponding unicast PDSCH, where UE expects to receive SPS PDSCH release and unicast PDSCH in a same slot (higher priority for unicast PDSCH).

Embodiment 10

UE reports HARQ-ACK for high priority transmission from either SPS release or unicast PDSCH where UE expects to receive SPS release and unicast PDSCH in a same slot. In case both SPS release and unicast PDSCH configured as high priority transmission then either of following options can be agreed: 1) UE transmits HARQ-ACK of SPS release in case UE expects SPS release and unicast PDSCH in a same slot, or 2) UE transmits HARQ-ACK of unicast PDSCH in case UE expects SPS release and unicast PDSCH in a same slot.

Embodiment 11

It may be the case that an SPS release and PDSCH come in different slots but they point to same 1-bit HARQ-ACK codebook. Hence, to resolve this HARQ-ACK dilemma, all the solutions considered for Embodiments 6 to 10 can be applied herein to this scenario (e.g., higher priority for SPS PDSCH release).

The following embodiments can be applied to all of the above embodiments.

Embodiment 12

The above embodiments can be applied to SPS configured with Type-1 or Type-2 HARQ-ACK codebook where UE can expect SPS release and unicast PDSCH in a same slot.

Embodiment 13

The unicast PDSCH is usually regarded as an SPS PDSCH, however, this can be extended to: 1) SPS release and unicast PDSCH in a same slot belong to the same SPS, 2) SPS release and unicast PDSCH in a same slot belong to the different SPSs, or 3) SPS release and unicast PDSCH in a same slot where unicast PDSCH belongs to a dynamic grant.

Embodiment 14

The SPS release can be in the above embodiments can be: 1) Release command (DCI) for single SPS, or 2) Release command (DCI/group-common DCI) for group release for multiple SPSs.

Embodiment 15

In this embodiment the base station transmits an SPS release DCI to the UE in a slot during which a PDSCH transmission for the UE is scheduled (i.e., the UE is expecting a PDSCH transmission in the slot).

If UE decodes SPS release DCI, then the UE sends ACK (positive acknowledgement) in the HARQ-ACK codebook (i.e., the ack resource meant for the PDSCH transmission) for +ve acknowledgement to the release of SPS.

If UE could not decode SPS release DCI, then it proceeds with PDSCH transmission feedback. That is, if UE decodes the PDSCH, UE sends ACK in the HARQ-ACK codebook. This situation should be avoided, however, because it can cause confusion at the base station. This can be avoided by the base station refraining from send the scheduled PDSCH transmission (i.e., base station only transmits the SPS release DCI) because it is very unlikely for a UE to decode PDSCH when no PDSCH is sent. If, however, the UE could not decode the PDSCH, UE sends NACK in the HARQ-ACK codebook. When the base station (e.g., gNB) receives the NACK, then the gNB understands that UE may be sending feedback for PDSCH rather SPS release DCI, accordingly the gNB then retransmits SPS release DCI.

Example implementations, in accordance with an embodiment, of the UE 102, base station 104 and host computer 130 above will now be described with reference to FIG. 2, which illustrates host computer 130 communicating via base station 104 with user equipment 102 over a partially wireless connection in accordance with some embodiments. In communication system 200, host computer 130 comprises hardware 215 including communication interface 216 configured to set up and maintain a wired or wireless connection with an interface of a different communication device of communication system 200. Host computer 130 further comprises processing circuitry 218, which may have storage and/or processing capabilities. In particular, processing circuitry 218 may comprise one or more programmable processors, application-specific integrated circuits, field programmable gate arrays or combinations of these (not shown) adapted to execute instructions. Host computer 130 further comprises software 211, which is stored in or accessible by host computer 130 and executable by processing circuitry 218. Software 211 includes host application 212. Host application 212 may be operable to provide a service to a remote user, such as UE 102 connecting via OTT connection 250 terminating at UE 102 and host computer 130. In providing the service to the remote user, host application 212 may provide user data which is transmitted using OTT connection 250.

Communication system 200 further includes base station 104 provided in a telecommunication system and comprising hardware 225 enabling it to communicate with host computer 130 and with UE 102. Hardware 225 may include communication interface 226 for setting up and maintaining a wired or wireless connection with an interface of a different communication device of communication system 200, as well as radio interface 227 for setting up and maintaining at least wireless connection 270 with UE 102 located in a coverage area (not shown in FIG. 2) served by base station 104. Communication interface 226 may be configured to facilitate connection 260 to host computer 130. Connection 260 may be direct or it may pass through a core network (not shown in FIG. 2) of the telecommunication system and/or through one or more intermediate networks outside the telecommunication system. In the embodiment shown, hardware 225 of base station 104 further includes processing circuitry 228, which may comprise one or more programmable processors, application-specific integrated circuits, field programmable gate arrays or combinations of these (not shown) adapted to execute instructions. Base station 104 further has software 221 stored internally or accessible via an external connection.

Communication system 200 further includes UE 102 already referred to. Its hardware 235 may include radio interface 237 configured to set up and maintain wireless connection 270 with a base station serving a coverage area in which UE 102 is currently located. Hardware 235 of UE 102 further includes processing circuitry 238, which may comprise one or more programmable processors, application-specific integrated circuits, field programmable gate arrays or combinations of these (not shown) adapted to execute instructions. UE 102 further comprises software 231, which is stored in or accessible by UE 102 and executable by processing circuitry 238. Software 231 includes client application 232. Client application 232 may be operable to provide a service to a human or non-human user via UE 102, with the support of host computer 130. In host computer 130, an executing host application 212 may communicate with the executing client application 232 via OTT connection 250 terminating at UE 102 and host computer 130. In providing the service to the user, client application 232 may receive request data from host application 212 and provide user data in response to the request data. OTT connection 250 may transfer both the request data and the user data. Client application 232 may interact with the user to generate the user data that it provides.

Figure 2:
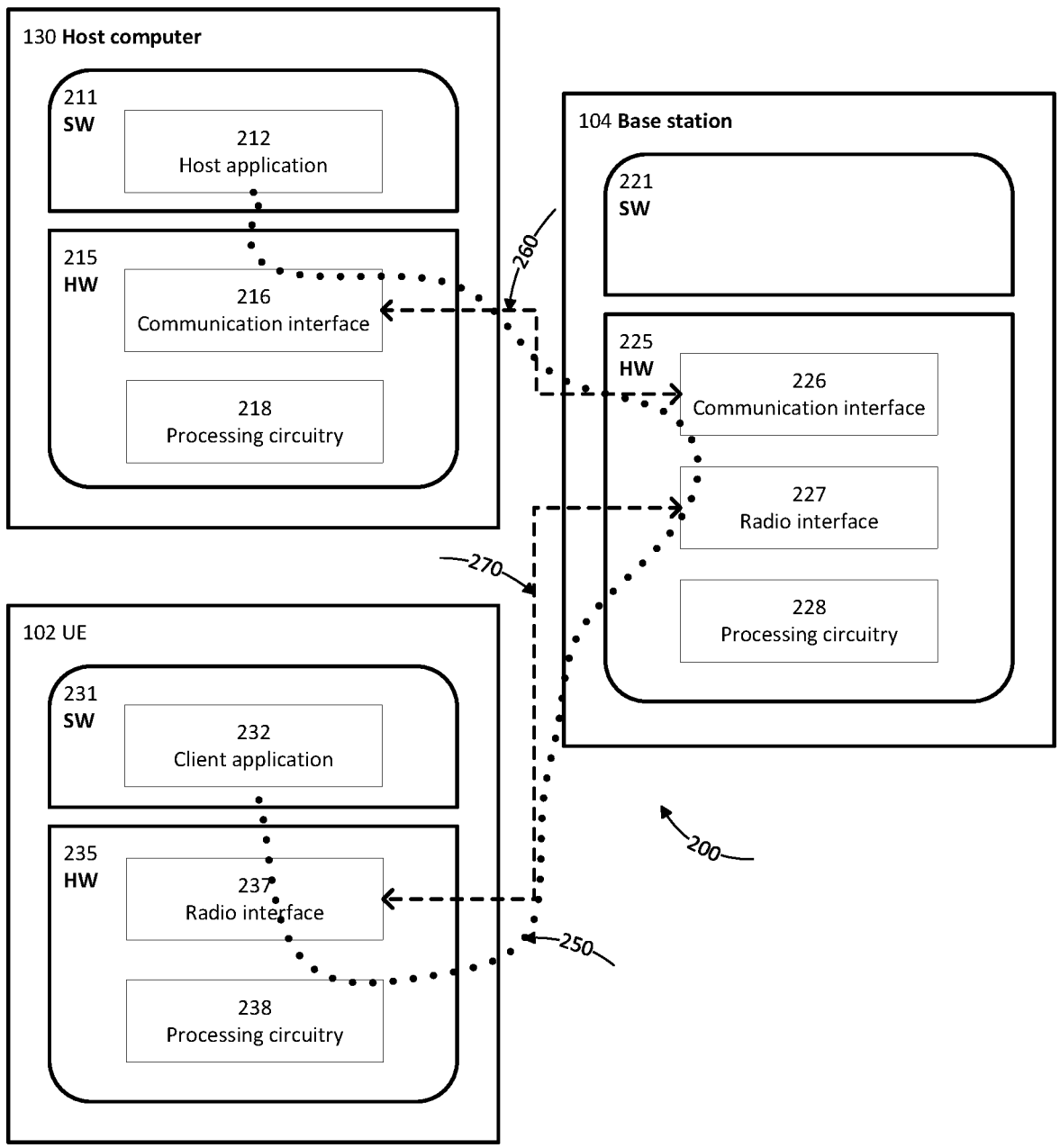
FIG. 2 is a generalized block diagram of a host computer communicating via a base station with a user equipment over a partially wireless connection.

In FIG. 2, OTT connection 250 has been drawn abstractly to illustrate the communication between host computer 130 and UE 102 via base station 104, without explicit reference to any intermediary devices and the precise routing of messages via these devices. Network infrastructure may determine the routing, which it may be configured to hide from UE 102 or from the service provider operating host computer 130, or both. While OTT connection 250 is active, the network infrastructure may further take decisions by which it dynamically changes the routing (e.g., on the basis of load balancing consideration or reconfiguration of the network).

Wireless connection 270 between UE 102 and base station 104 is in accordance with the teachings of the embodiments described throughout this disclosure. One or more of the various embodiments improve the performance of OTT services provided to UE 102 using OTT connection 250, in which wireless connection 270 forms the last segment. More precisely, the teachings of these embodiments may improve one or more of the data rate, latency, block error ratio (BLER), overhead, and power consumption and thereby provide benefits such as reduced user waiting time, better responsiveness, extended battery lifetime, etc.

A measurement procedure may be provided for the purpose of monitoring data rate, latency and other factors on which the one or more embodiments improve. There may further be an optional network functionality for reconfiguring OTT connection 250 between host computer 130 and UE 102, in response to variations in the measurement results. The measurement procedure and/or the network functionality for reconfiguring OTT connection 250 may be implemented in software 211 and hardware 215 of host computer 130 or in software 231 and hardware 235 of UE 102, or both. In embodiments, sensors (not shown) may be deployed in or in association with communication devices through which OTT connection 250 passes; the sensors may participate in the measurement procedure by supplying values of the monitored quantities exemplified above, or supplying values of other physical quantities from which software 211, 231 may compute or estimate the monitored quantities. The reconfiguring of OTT connection 250 may include message format, retransmission settings, preferred routing etc.; the reconfiguring need not affect base station 104, and it may be unknown or imperceptible to base station 104. Such procedures and functionalities may be known and practiced in the art. In certain embodiments, measurements may involve proprietary UE signaling facilitating host computer 130's measurements of throughput, propagation times, latency and the like. The measurements may be implemented in that software 211 and 231 causes messages to be transmitted, in particular empty or 'dummy' messages, using OTT connection 250 while it monitors propagation times, errors etc.

Figure 3:
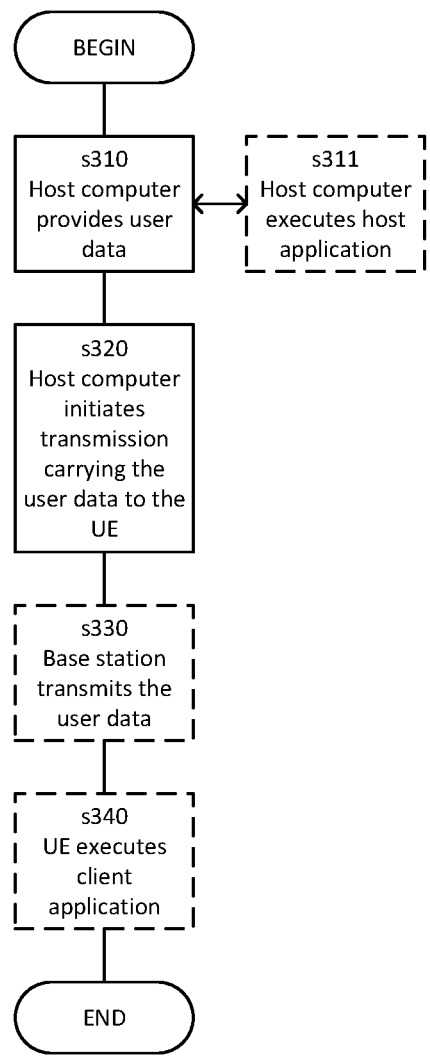
FIG. 3 is a flowchart illustrating a process according to an embodiment.

FIG. 3 is a flowchart illustrating a method implemented in a communication system, in accordance with one embodiment. The communication system includes a host computer, a base station and a UE which may be those described with reference to FIG. 1 and FIG. 2. In step S310, the host computer provides user data. In substep S311 (which may be optional) of step S310, the host computer provides the user data by executing a host application. In step S320, the host computer initiates a transmission carrying the user data to the UE. In step S330 (which may be optional), the base station transmits to the UE the user data which was carried in the transmission that the host computer initiated, in accordance with the teachings of the embodiments described throughout this disclosure. In step S340 (which may also be optional), the UE executes a client application associated with the host application executed by the host computer.

Figure 4:
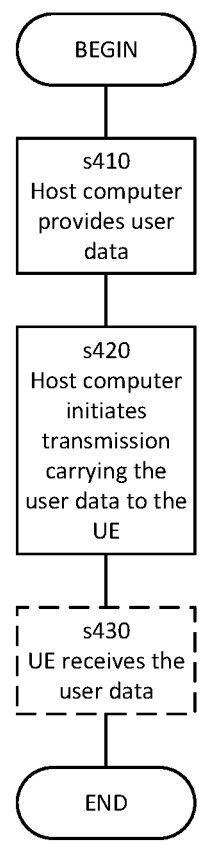
FIG. 4 is a flowchart illustrating a process according to an embodiment.

FIG. 4 is a flowchart illustrating a method implemented in a communication system, in accordance with one embodiment. The communication system includes a host computer, a base station and a UE which may be those described with reference to FIG. 1 and FIG. 2. For simplicity of the present disclosure, only drawing references to FIG. 4 will be included in this section. In step S410 of the method, the host computer provides user data. In an optional substep (not shown) the host computer provides the user data by executing a host application. In step S420, the host computer initiates a transmission carrying the user data to the UE. The transmission may pass via the base station, in accordance with the teachings of the embodiments described throughout this disclosure. In step S430 (which may be optional), the UE receives the user data carried in the transmission.

Figure 5:
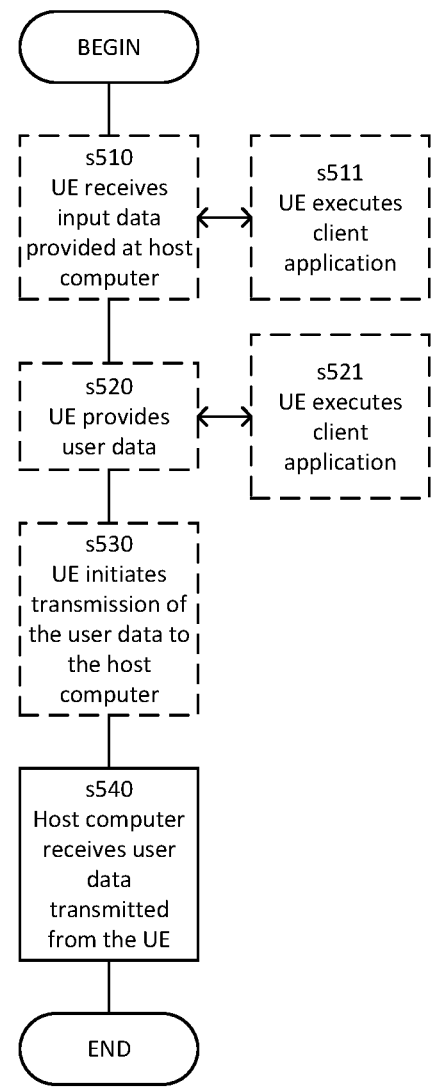
FIG. 5 is a flowchart illustrating a process according to an embodiment.

FIG. 5 is a flowchart illustrating a method implemented in a communication system, in accordance with one embodiment. The communication system includes a host computer, a base station and a UE which may be those described with reference to FIG. 1 and FIG. 2. For simplicity of the present disclosure, only drawing references to FIG. 5 will be included in this section. In step S510 (which may be optional), the UE receives input data provided by the host computer. Additionally or alternatively, in step S520, the UE provides user data. In substep S521 (which may be optional) of step S520, the UE provides the user data by executing a client application. In substep S511 (which may be optional) of step S510, the UE executes a client application which provides the user data in reaction to the received input data provided by the host computer. In providing the user data, the executed client application may further consider user input received from the user. Regardless of the specific manner in which the user data was provided, the UE initiates, in substep S530 (which may be optional), transmission of the user data to the host computer. In step S540 of the method, the host computer receives the user data transmitted from the UE, in accordance with the teachings of the embodiments described throughout this disclosure.

Figure 6:
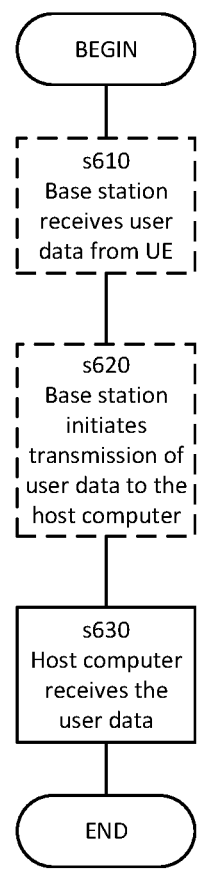
FIG. 6 is a flowchart illustrating a process according to an embodiment.

FIG. 6 is a flowchart illustrating a method implemented in a communication system, in accordance with one embodiment. The communication system includes a host computer, a base station and a UE which may be those described with reference to FIG. 1 and FIG. 2. For simplicity of the present disclosure, only drawing references to FIG. 6 will be included in this section. In step S610 (which may be optional), in accordance with the teachings of the embodiments described throughout this disclosure, the base station receives user data from the UE. In step S620 (which may be optional), the base station initiates transmission of the received user data to the host computer. In step S630 (which may be optional), the host computer receives the user data carried in the transmission initiated by the base station.

Figure 7:
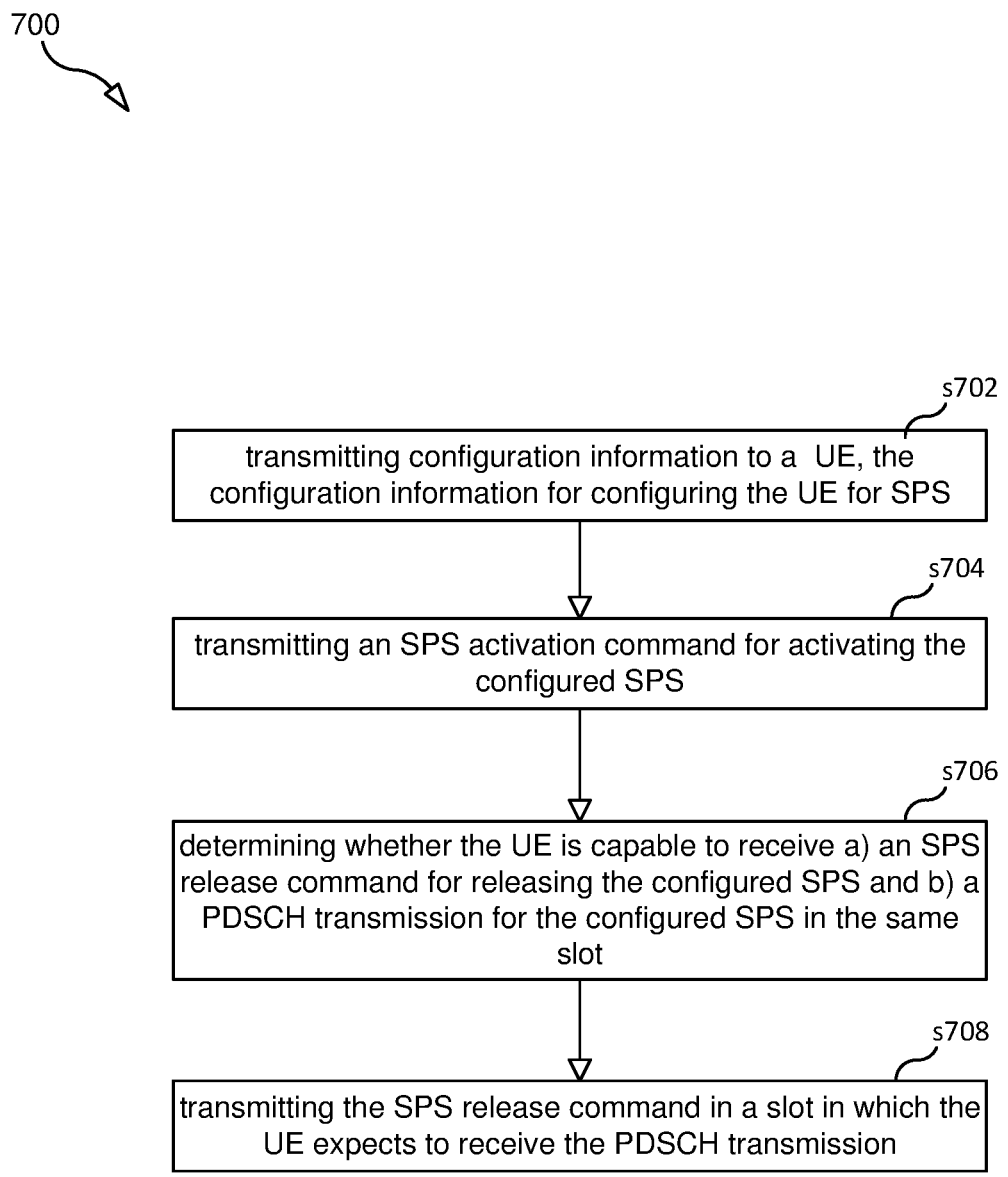
FIG. 7 is a flowchart illustrating a process according to an embodiment.

FIG. 7 is a flowchart illustrating a process 700, according to one embodiment, that is performed by a base station. Process 700 may begin in step s702. Step s702 comprises transmitting configuration information to a user equipment, UE, the configuration information for configuring the UE for semi-persistent scheduling, SPS. Step s704 comprises transmitting an SPS activation command for activating the configured SPS. Step s706 comprises determining whether the base station is allowed to transmit to the UE in the same slot a) an SPS release command for releasing the configured SPS and b) a PDSCH transmission for the configured SPS (i.e., determining whether the UE is capable to receive a) an SPS release command for releasing the configured SPS and b) a PDSCH transmission for the configured SPS in the same slot). Step s708 comprises, after determining that the base station is allowed to transmit to the UE in the same slot a) the SPS release command for releasing the configured SPS and b) the PDSCH transmission for the configured SPS (i.e., after determining that the UE is capable to receive a) the SPS release command for releasing the configured SPS and b) the PDSCH transmission for the configured SPS in the same slot), transmitting the SPS release command in a slot in which the UE expects to receive the PDSCH transmission for the configured SPS.

In some embodiments, the process further includes receiving a hybrid automatic repeat request, HARQ, negative acknowledgement, NACK, transmitted by the UE using an acknowledgement resource associated with the expected PDSCH transmission.

In some embodiments, the process further includes, as a result of receiving the NACK, the base station transmitting to the UE a second SPS release command for releasing the configured SPS.

In some embodiments, the process further includes receiving a hybrid automatic repeat request, HARQ, positive acknowledgement, ACK, transmitted by the UE using an acknowledgement resource associated with the expected PDSCH transmission, wherein the base station interprets the ACK as indicating that the UE has successfully decoded the SPS release command.

In some embodiments, transmitting the SPS release command comprises transmitting the SPS release command such that the SPS release command is received by the UE at least X units of time prior to the acknowledgement resource associated with the expected PDSCH transmission.

In some embodiments, the base station determines whether the UE is capable to receive a) an SPS release command for releasing the configured SPS and b) a physical downlink shared channel, PDSCH, transmission for the configured SPS in the same slot based on information about a configuration or capability of the UE.

In some embodiments, the SPS release command is a group release command for multiple SPSs.

In some embodiments, transmitting the SPS release command in the slot in which the UE expects to receive the PDSCH transmission comprises transmitting the SPS release command at least X time-units before an HARQ-ACK codebook so that the HARQ-ACK codebook can be used to acknowledge SPS release command.

In some embodiments, the UE expects to receive the PDSCH transmission in a resource of the configured SPS, and transmitting the SPS release command in the slot in which the UE expects to receive the PDSCH transmission comprises transmitting the SPS release command before the end of the resource in which the UE expects to receive the PDSCH transmission.

In some embodiments, the UE expects to receive the PDSCH transmission in a resource of the configured SPS, and transmitting the SPS release command in the slot in which the UE is expected to receive the PDSCH transmission comprises transmitting the SPS release command such that the beginning of the SPS release command comes before the end of the resource in which the UE expects to receive the PDSCH transmission. In some embodiments, the base station does not transmit the expected PDSCH transmission in the slot in which the UE is expected to receive the PDSCH transmission.

Figure 8A:
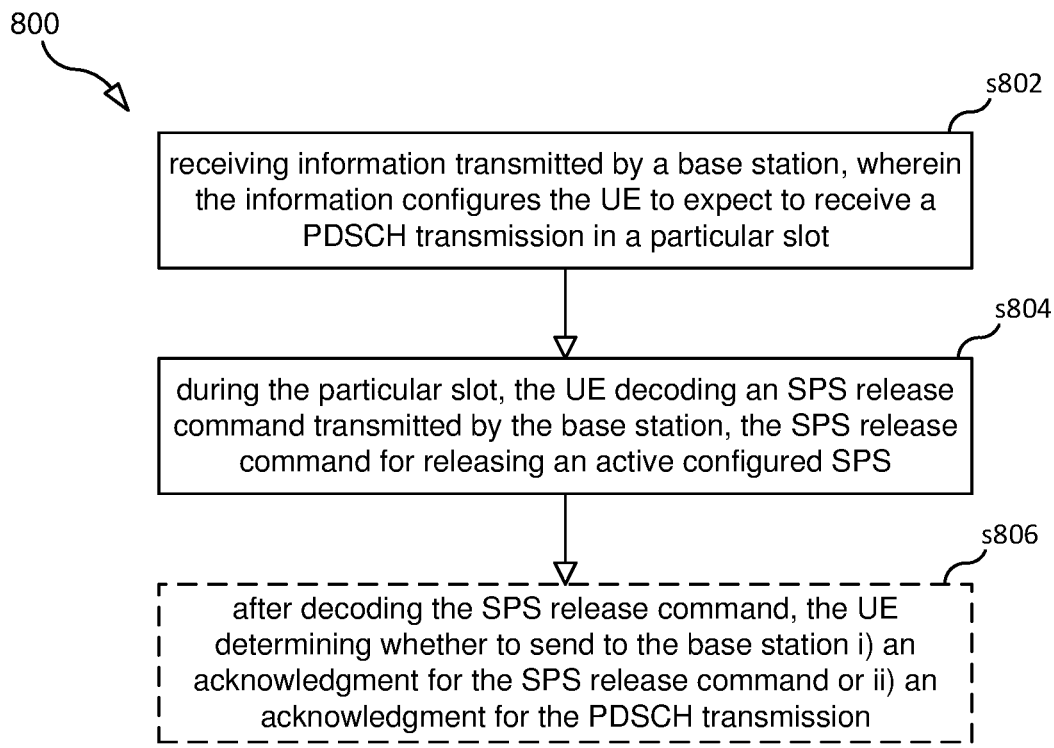
FIG. 8A is a flowchart illustrating a process according to an embodiment.

FIG. 8A is a flowchart illustrating a process 800, according to one embodiment, that is performed by a UE. Process 800 may begin in step s802. Step s802 comprises the UE receiving information transmitted by a base station, wherein the information transmitted by the base station configures the UE to expect to receive a PDSCH transmission in a particular slot. Step s804 comprises, during the particular slot, the UE decoding an SPS release command transmitted by the base station, the SPS release command for releasing an active configured SPS.

In some embodiments, the method further includes, after decoding the SPS release command, the UE determining (step s806), based on a rule, whether to send to the base station i) an acknowledgment for the SPS release command or ii) an acknowledgment for the PDSCH transmission.

In some embodiments, the rule specifies that the SPS release command has higher priority than the PDSCH transmission, and the process further comprises the UE using an acknowledgement resource associated with the PDSCH transmission to transmit to the base station a positive acknowledgement for the SPS release command regardless of whether or not the UE was able to decode the PDSCH transmission.

In some embodiments, the rule specifies that the SPS release command has lower priority than the PDSCH transmission, and the process further comprises the UE using an acknowledgement resource associated with the PDSCH transmission to transmit to the base station an acknowledgement for the PDSCH transmission regardless of whether or not the UE was able to decode the SPS release command.

In some embodiments, the information transmitted by the base station configures the UE to expect to receive a PDSCH transmission in a particular sub-slot of the particular slot.

In some embodiments, the UE receives the SPS release command during the particular sub-slot or during another sub-slot of the particular slot.

In some embodiments, the process further comprises the receiving configuration information for configuring the UE for SPS, and the information transmitted by the base station comprises an SPS activation command for activating the SPS configuration.

In some embodiments, the information transmitted by the base station comprises a dynamic grant.

In some embodiments, the process further comprises the UE transmitting a hybrid automatic repeat request, HARQ, negative acknowledgement, NACK, using an acknowledgement resource associated with the expected PDSCH transmission.

In some embodiments, the process further comprises the UE, after transmitting the NACK, decoding a second SPS release command for releasing the configured SPS.

In some embodiments, the process further comprises the UE successfully decoding the SPS release command, and, as a result of successfully decoding the SPS release command, transmitting a hybrid automatic repeat request, HARQ, positive acknowledgement, ACK, using an acknowledgement resource associated with the expected PDSCH transmission.

In some embodiments, the UE receives the SPS release command at least X units of time prior to an acknowledgement resource associated with the expected PDSCH transmission.

In some embodiments, the SPS release command is a group release command for multiple SPSs.

In some embodiments, the UE expects to receive the PDSCH transmission in a resource of a configured SPS, and the UE receives the SPS release command before the end of the resource in which the UE expects to receive the PDSCH transmission.

In some embodiments, the UE expects to receive the PDSCH transmission in a resource of a configured SPS, and the UE receives the SPS release command the beginning of the SPS release command before the end of the resource in which the UE expects to receive the PDSCH transmission.

In some embodiments, the process further comprises the UE indicating a capability to receive a semi-persistent scheduling, SPS, release command in a slot in which the UE is configured to receive a PDSCH for a configured SPS transmission.

Figure 8B:
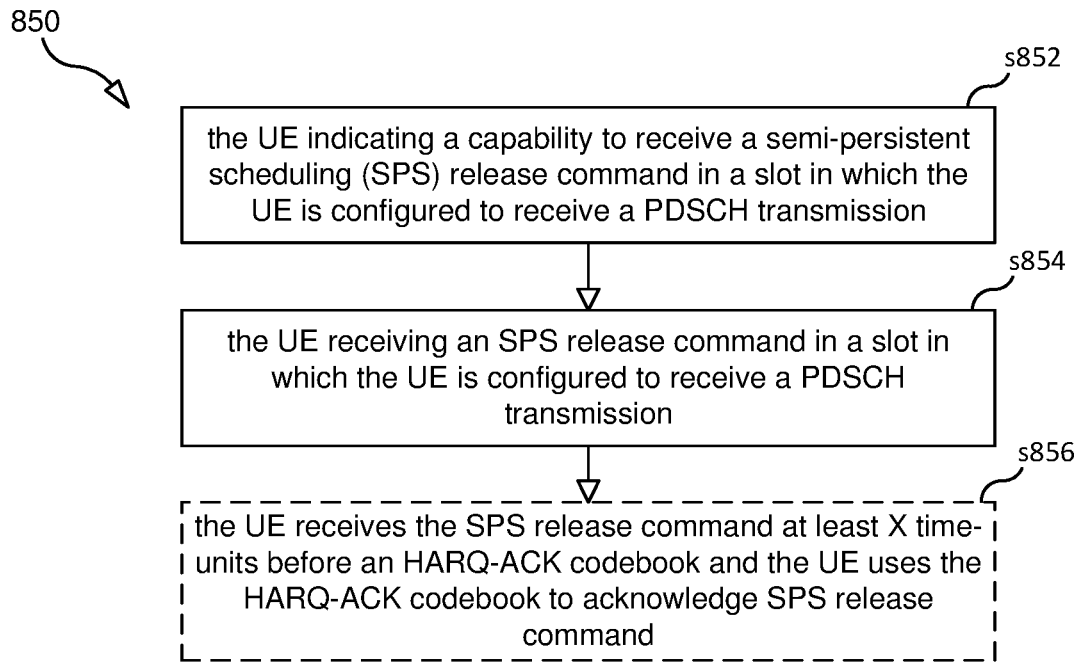
FIG. 8B is a flowchart illustrating a process according to an embodiment.

FIG. 8B is a flowchart illustrating a process 850, according to one embodiment, that is performed by a UE. Process 850 may begin in step s852. Step s852 comprises the UE indicating a capability to receive a semi-persistent scheduling (SPS) release command in a slot in which the UE is configured to receive a PDSCH transmission. Step s854 comprises the UE receiving an SPS release command in a slot in which the UE is configured to receive a PDSCH transmission. In some embodiments, the UE receives the SPS release command at least X time-units before an HARQ-ACK codebook, and the method further comprises the UE using (s856) the HARQ-ACK codebook to acknowledge SPS release command.

Figure 9:
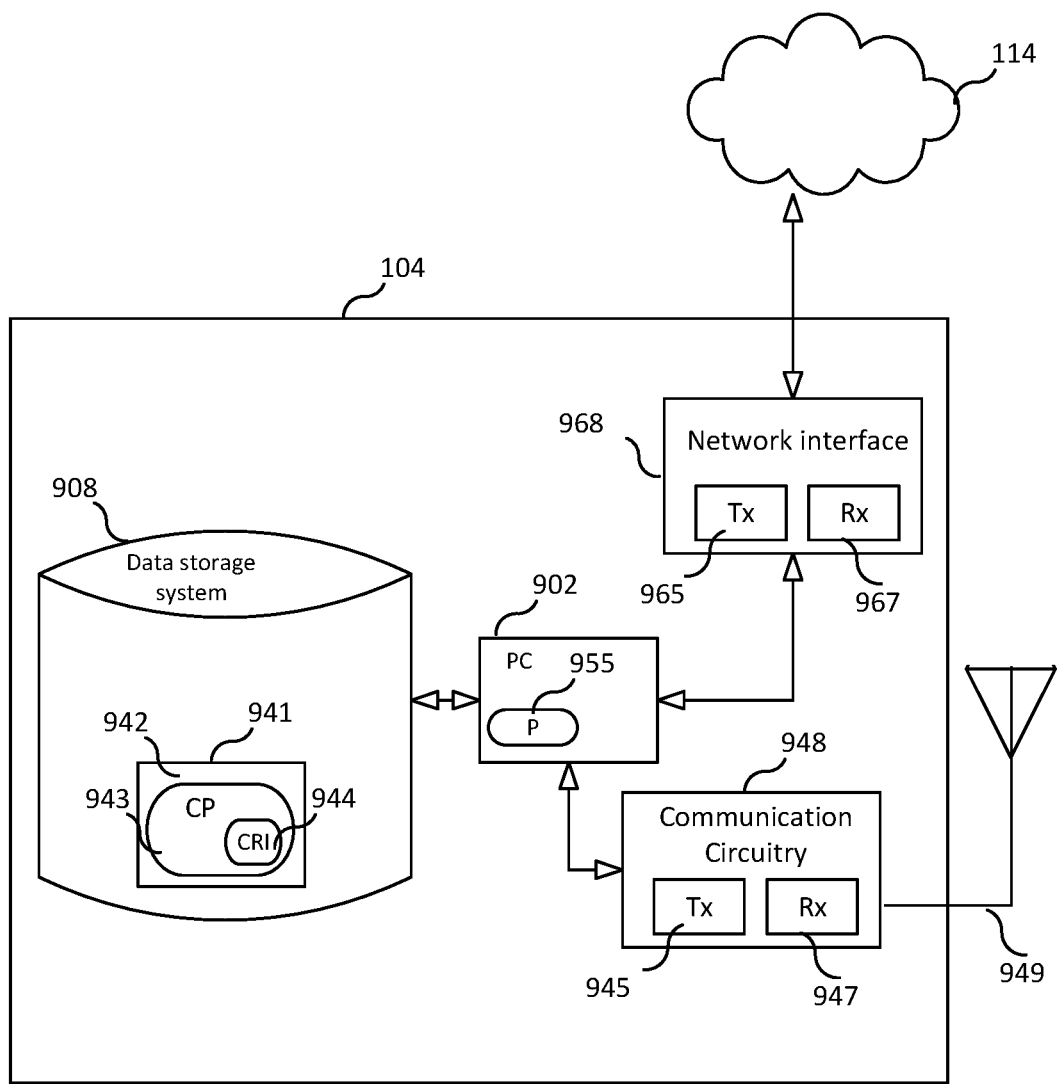
FIG. 9 is a block diagram of a base station according to an embodiment.

FIG. 9 is a block diagram of base station 104, according to some embodiments. As shown in FIG. 9, base station 104 may comprise: processing circuitry (PC) 902, which may include one or more processors (P) 955 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., base station 104 may be a distributed computing apparatus); a network interface 968 comprising a transmitter (Tx) 965 and a receiver (Rx) 967 for enabling base station 104 to transmit data to and receive data from other nodes connected to a network 110 (e.g., an Internet Protocol (IP) network) to which network interface 968 is connected; communication circuitry 948, which is coupled to an antenna arrangement 949 comprising one or more antennas and which comprises a transmitter (Tx) 945 and a receiver (Rx) 947 for enabling base station 104 to transmit data and receive data (e.g., wirelessly transmit/receive data); and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes base station 104 to perform steps described herein (e.g., steps described herein with reference to the flow charts). In other embodiments, base station 104 may be configured to perform steps described herein without the need for code. That is, for example, PC 902 may consist merely of one or more ASICs. Hence, the features of the embodiments described herein may be implemented in hardware and/or software.

Figure 10:
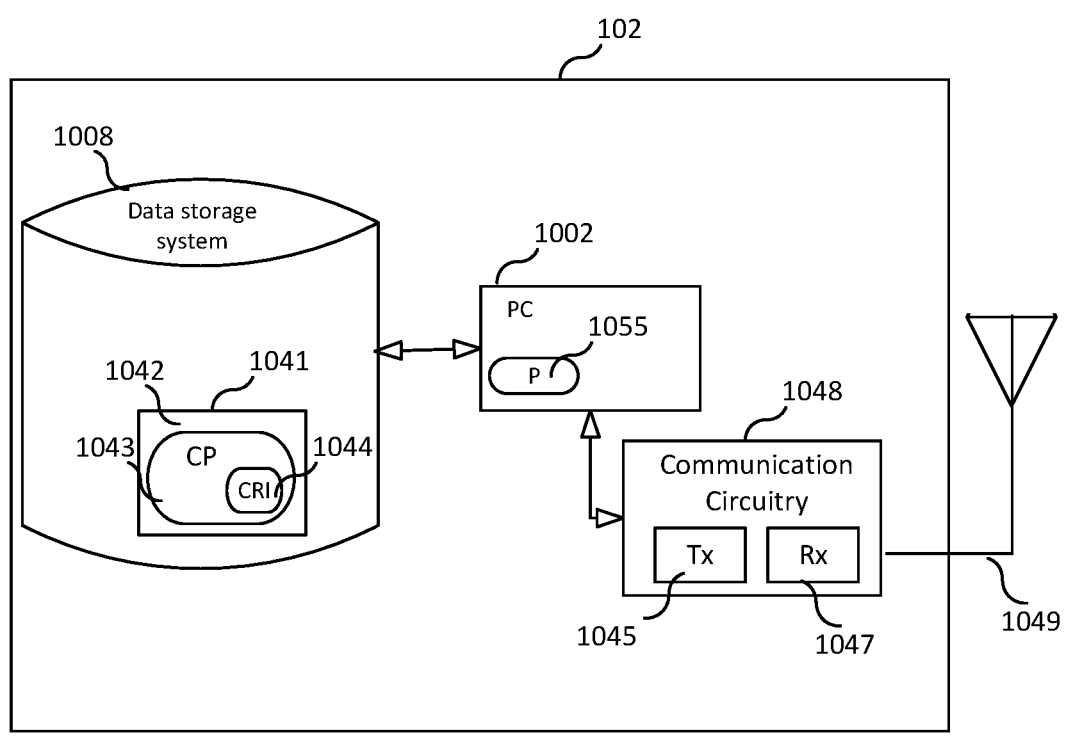
FIG. 10 is a block diagram of a UE according to an embodiment.

FIG. 10 is a block diagram of UE 102, according to some embodiments. As shown in FIG. 10, UE 102 may comprise: processing circuitry (PC) 1002, which may include one or more processors (P) 1055 (e.g., one or more general purpose microprocessors and/or one or more other processors, such as an application specific integrated circuit (ASIC), field-programmable gate arrays (FPGAs), and the like); communication circuitry 1048, which is coupled to an antenna arrangement 1049 comprising one or more antennas and which comprises a transmitter (Tx) 1045 and a receiver (Rx) 1047 for enabling UE 102 to transmit data and receive data (e.g., wirelessly transmit/receive data); and a local storage unit (a.k.a., "data storage system") 1008, which may include one or more non-volatile storage devices and/or one or more volatile storage devices. In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes UE 102 to perform steps described herein (e.g., steps described herein with reference to the flow charts). In other embodiments, UE 102 may be configured to perform steps described herein without the need for code. That is, for example, PC 1002 may consist merely of one or more ASICs. Hence, the features of the embodiments described herein may be implemented in hardware and/or software.

Contribution

This contribution addresses the Rel-16 NR IIoT/URLLC maintenance issue of DL SPS enhancement. In reference [1] it was proposed that: in case of collision in time domain among SPS PDSCHs each without a corresponding PDCCH, a UE receives and decodes only one of SPS PDSCHs with the lowest SPS configuration index within a group of overlapping SPS PDSCHs on the same serving cell. A SPS PDSCH belongs to a group of overlapping SPS PDSCHs. If its SLIV is within the starting symbol of the first SPS PDSCH in that group, and the last symbol of the last SPS PDSCH in that group, and If this SPS PDSCH overlaps in time at least with another SPS PDSCH on the same serving cell in a slot, and If the starting and ending symbols of this SPS PDSCH overlaps in time at least with another SPS PDSCH on the same serving cell in a slot if the SPS PDSCH is neither the first nor the last SPS PDSCH in the group.

In case of collision in time domain among SPS PDSCHs each without a corresponding PDCCH, A UE receives and decodes one or more of SPS PDSCHs within a group of overlapping SPS PDSCHs on the same serving cell according to the following procedure. Step 0: set j=0-number of selected PDSCH for decoding. Set Q to set of activated SPS PDSCHs within a slot. Step 1: A UE receives and decodes one of SPS PDSCHs with the lowest SPS configuration index within Q, set j=j+1. Designate the received SPS PDSCH as survivor SPS PDSCH. Step 2: The received/decoded SPS PDSCH and any other SPS PDSCH(s) overlapping, even partially, the survivor SPS PDSCH are excluded from Q. Step 3: Repeat step 1 and 2 until the group is empty or j≥N, where N is the number of unicast PDSCHs in a slot supported by the UE.

In case dynamic scheduled PDSCH and multiple SPS PDSCHs are overlapped in time domain, at first, the UE resolves overlapped multiple SPS PDSCHs (first step) and then resolves overlapping between dynamic scheduled PDSCH and one or multiple SPS PDSCHs to be selected to decode from first step (second step).

For a UE not indicating a capability to receive more than one unicast PDSCH per slot, the UE does not expect to receive SPS PDSCH release and unicast PDSCH in a same slot associated with the same PUCCH slot.

It is RAN1 understanding from the current specification that a UE can receive SPS PDSCH release in a slot where SPS PDSCH is to be transmitted.

Next, in reference [2] it was stated that: for a UE not indicating a capability to receive more than one unicast PDSCH per slot, with Type-1 HARQ-ACK codebook, Rel-15 spec does not allow SPS release and unicast PDSCH to be transmitted in the same slot. The reason for adding the restriction is to avoid HARQ-ACK feedback issue, so that there is only a single HARQ-ACK bit for each slot. The restriction does not really result in much problem in Rel-15 as it should not be difficult for the gNB to find a slot to transmit SPS release (when it is not transmitting unicast PDSCH). However in Rel-16, in case of 1-slot periodicity for SPS, for such UE (capable of only a single PDSCH decoding per slot), the gNB would never have a chance to transmit a SPS release, which could be problematic.

For this issue, we can consider three cases: Case A: SPS PDSCH release and dynamic PDSCH in a slot (this can be handled by gNB scheduling (e.g., by delaying SPS release)); Case B: SPS PDSCH release and SPS PDSCH for different SPS configurations in a slot (this can be handled by gNB implementation. (e.g., by delaying SPS PDSCH release to the slot in which the SPS PDSCH with same configuration is to be transmitted)); Case C: SPS PDSCH release and SPS PDSCH for a same SPS configuration in a slot.

Based on the discussions, there is clearly different understanding among companies on the following aspects.

Q1: Would the UE discard any SPS PDSCH release in a slot where SPS PDSCH is transmitted? Or, does the current spec support that the UE receives SPS PDSCH release in a slot where SPS PDSCH is transmitted?

Q2: Is there any additional specification impact required for supporting Case C (e.g., the latest PDCCH monitoring occasion the release can be sent, where to be ready to buffer up SPS PDSCH, etc)?

In this contribution, we discuss the remaining issues on DL-SPS and other remaining issues.

Discussion 1.1 SPS PDSCH Collisions

There has been a discussion on how to determine the overlapping SPS PDSCHs among a group of SPS PDSCHs. This can be done through a stepwise procedure:

Step 0: set j=0-number of selected PDSCH for decoding. Set Q to set of activated SPS PDSCHs within a slot.

Step 1: A UE receives and decodes one of SPS PDSCHs with the lowest SPS configuration index within Q, set j=j+1. Designate the received SPS PDSCH as survivor SPS PDSCH.

Step 2: The received/decoded SPS PDSCH and any other SPS PDSCH(s) overlapping, even partially, the survivor SPS PDSCH are excluded from Q.

Step 3: Repeat step 1 and 2 until the group is empty or j≥N, where N is the number of unicast PDSCHs in a slot supported by the UE.

This procedure ensures decoding for all SPS PDSCH that do not overlap with a SPS PDSCH with lower index which is not dropped.

Proposal 1: Support Option 2 for determining which PDSCHs to decode among overlapped SPS PDSCHs.

1.2 Collision Between a Dynamic PDSCH and a Group of SPS PDSCHs

Collision may also happen between a dynamic PDSCH and a group of SPS PDSCHs. One alternative is to resolve the collision is to count the dynamic PDSCH as an SPS with the lowest index and then run the procedure in Option 2 over the set of PDSCHs. However, a complication arises since the dynamic PDSCH is associated with a DCI, then detection or mis-detection of the DCI affects the output of the procedure. In case of DCI mis-detection, DAI does not help here since knowing about a missed DL assignment does not tell the UE about the time domain allocation of the missed DL assignment, and different allocations can result in different collision handling, leading to codebook size mismatch. Another alternative is to resolve the collision between SPS PDSCHS and dynamic PDSCH separately. That is, by the procedure in Option 2 first collision between SPS PDSCHs is resolved and then dynamic PDSCH is selected if any of the SPS PDSCHs that are selected are colliding with the dynamic PDSCH.

Proposal: Separate collision handling between dynamic and a group of SPS PDSCHs.

1.3 SPS PDSCH Release for UEs with Single PDSCH Decoding Per Slot Capability

In Section 9.1.2.1 in 38.213 V16.1 is stated that UE does not expect to receive SPS PDSCH release and unicast PDSCH in a same slot. Specifically, it states, if the UE does not indicate a capability to receive more than one unicast PDSCH per slot and R≠Ø, $M_{A,c}=M_{A,c}Y_j$; j=j+1. The UE does not expect to receive SPS PDSCH release and unicast PDSCH in a same slot.

For a UE working based on Rel. 15, there would not be any issue since the minimum periodicity is 10 msec and gNB can find a slot for transmitting SPS release. But for a UE working based on Rel-16 which can be configured based on unit slot periodicity, then UE does not expect to receive SPS release in Type 1 HARQ ACK codebook construction. Therefore, there would not be a time for releasing an SPS configuration.

Proposal: The UE may receive SPS PDSCH release and unicast PDSCH in a same slot. When a UE receives SPS PDSCH release in a slot, the UE sends HARQ-ACK for that SPS-PDSCH release. Then, the UE reports HARQ-ACK for corresponding SPS release (or group SPS release) whenever it receives in a same slot SPS release and unicast PDSCH.

Proposal: The UE reports positive HARQ-ACK for a corresponding received SPS PDSCH release, where UE expects to receive SPS PDSCH release and unicast PDSCH in a same slot.

1.4 Priority Indication by DCI

In TS38.213 V16.0, it has been stated that: "A PUSCH or a PUCCH, including repetitions if any, can be of priority index 0 or of priority index 1. If a priority index is not provided for a PUSCH or a PUCCH, the priority index is 0. If in an active DL BWP a UE monitors PDCCH either for detection of DCI format 0_1 and DCI format 1_1 or for detection of DCI format 0_2 and DCI format 1_2, a priority index can be provided by a priority indicator field."

The priority indication by DCI does not follow for uplink configured grant transmission and downlink SPS. Accordingly, UE procedure for reporting control information is proposed as follows. A PUSCH or a PUCCH, including repetitions if any, can be of priority index 0 or of priority index 1. If a priority index is not provided for a PUSCH or a PUCCH, the priority index is 0. If in an active DL BWP a UE monitors PDCCH for detection of DCI format 0_1 and DCI format 0_2 a priority index can be provided by a priority indicator field in DCI, except for Type 1 and Type 2 configured grant PUSCH, of which the priority is provided by higher layer. If in an active DL BWP a UE monitors PDCCH for detection of DCI format 1_1 and DCI format 1_2, a priority index can be provided by a priority indicator field in DCI, except for a HARQ-ACK in response to a SPS PDSCH and a PDCCH indicating a SPS PDSCH release, of which the priority is provided by higher layer.

1.5 PHR Reporting in Case of Intra-UE Collision

Rel-16 eURLLC allows dropping of lower priority PUSCH in case two PUSCHs belonging to different priorities collide, e.g., where a low-priority CG PUSCH collides with high-priority dynamic PUSCH. Pertinent to PHR reporting, if the PUSCH is dropped due to incoming dynamic PUSCH, then it may happen that PHR calculation based on non-transmitted CG PUSCH is utilized even though dynamic PUSCH is prioritized. The reason for not including calculation based on dynamic PUSCH is the insufficient timeline. However, this problem is not limited to PUSCHs collision but can be applicable to PUCCHs collision scenario.

To resolve this problem, gNB can recognize the situation that the PUSCH carrying PHR may not be based on prioritized PUSCH rather based on cancelled deprioritized PUSCH. In such situation, gNB can trigger another request for the PHR reporting or gNB can wait for next occasion when PHR will be reported again, and in the mean gNB can be judicious in allocating full power PUSCH transmission.

Proposal: The PHR reporting inconsistency due to intra-UE collision can be resolved with gNB's implementation, and thus, there is a no need to specify explicit behavior.

1.6 Intra-UE Prioritization with No Data

In Rel-16 eURLLC, the intra-UE prioritization involving CG PUSCH depends on the condition whether CG allocation has data to transmit or not. In the specification, TS 38.214, Section 6.1.2.3, Resource allocation for uplink transmission with configured grant, it is mentioned, "The UE shall not transmit anything on the resources configured by configuredGrantConfig if the higher layers did not deliver a transport block to transmit on the resources allocated for uplink transmission without grant."

Hence, in case of intra-prioritization, e.g., between dynamic PUSCH and CG PUSCH, or between two CG PUSCHs, if the involving CG with high priority does not have data to transmit, then the other low priority PUSCH will be transmitted. However, on the other hand, specifically in the case involving high priority dynamic PUSCH and low priority CG PUSCH, if the higher layer did not deliver a transport block to transmit on this dynamic PUSCH, still dynamic PUSCH will be prioritized according to the current spec. This means UE prioritized an empty dynamic PUSCH over a meaningful CG PUSCH. Therefore, in such scenarios, the same behavior should be applied as in case with no data for CG, i.e., the UE shall not transmit anything on the dynamic PUSCH if the higher layers did not deliver a transport block and the UE shall instead transmit the low priority CG PUSCH.

Proposal: The UE shall not transmit anything on the dynamic PUSCH if the higher layers did not deliver a transport block.

Conclusion

In conclusion, the following proposal are made:
Proposal 1: Support Option 2 for determining the overlapped SPS PDSCHs;
Proposal 2: Separate collision handling between dynamic and a group of SPS PDSCHs;
Proposal 3: Modification in the text as: UE may receive SPS PDSCH release and unicast PDSCH in a same slot;
Proposal 4: UE reports HARQ-ACK for a corresponding received SPS PDSCH release;
Proposal 5: The PHR reporting inconsistency due to intra-UE collision can be resolved with gNB's implementation, and thus, there is a no need to specify explicit behavior; and
Proposal 6: UE shall not transmit anything on the dynamic PUSCH if the higher layers did not deliver a transport block.

Summary of Various Embodiments

A1. A method performed by a base station, the method comprising: transmitting (s702) configuration information to a user equipment, UE, the configuration information for configuring the UE for semi-persistent scheduling, SPS; transmitting (s704) an SPS activation command for activating the configured SPS; determining (s706) whether the base station is allowed to transmit to the UE in the same slot both a) an SPS release command for releasing the configured SPS and b) a PDSCH transmission (i.e., determining whether the UE is capable to receive a) an SPS release command for releasing the configured SPS and b) a PDSCH transmission in the same slot); and after determining that the base station is allowed to transmit to the UE in the same slot both a) the SPS release command for releasing the configured SPS and b) the PDSCH transmission (i.e., after determining that the UE is capable to receive a) an SPS release command for releasing the configured SPS and b) a PDSCH transmission in the same slot), transmitting (s708) the SPS release command in a slot in which the UE is expected to receive the PDSCH transmission.

A2. The method of embodiment A1, further comprising receiving a negative acknowledgement, NACK, transmitted by the UE using an acknowledgement resource associated with the PDSCH transmission.

A3. The method of embodiment A2, further comprising, as a result of receiving the NACK, the base station transmitting to the UE a second SPS release command for releasing the configured SPS.

A4. The method of embodiment A1, further comprising receiving a positive acknowledgement, ACK, transmitted by the UE using an acknowledgement resource associated with the PDSCH transmission, wherein the base station interprets the ACK as indicating that the UE has successfully decoded the SPS release command.

A5. The method of any one of embodiments A2-A4, wherein transmitting the SPS release command comprises transmitting the SPS release command such that the SPS release command is received by the UE at least X units of time prior to the acknowledgement resource associated with the PDSCH transmission.

A6. The method of any one of embodiments A1-A5, wherein the base station determines whether it is allowed to transmit to the UE in the same slot both a) the SPS release command for releasing the configured SPS and b) the PDSCH transmission based on information about a configuration or capability of the UE.

A7. The method of any one of embodiments A1-A6, wherein the SPS release command is a group release command for multiple SPSs.

A8. The method of any one of embodiments A1-A7, wherein transmitting the SPS release command in the slot in which the UE is expected to receive the PDSCH transmission comprises transmitting the SPS release command at least X time-units before an HARQ-ACK codebook so that the HARQ-ACK codebook can be used to acknowledge SPS release command.

A9. The method of any one of embodiments A1-A7, wherein the UE expects to receive the PDSCH transmission in a resource of the configured SPS, and transmitting the SPS release command in the slot in which the UE expects to receive the PDSCH transmission comprises transmitting the SPS release command before the end of the resource in which the UE expects to receive the PDSCH transmission.

A10. The method of any one of embodiments A1-A7, wherein the UE expects to receive the PDSCH transmission in a resource of the configured SPS, and transmitting (s708) the SPS release command in the slot in which the UE is expected to receive the PDSCH transmission comprises transmitting the SPS release command such that the beginning of the SPS release command comes before the end of the resource in which the UE expects to receive the PDSCH transmission.

A11. The method of any one of embodiments A1-A10, wherein the base station does not transmit the expected PDSCH transmission in the slot in which the UE is expected to receive the PDSCH transmission.

B1. A method performed by a user equipment, UE, the method comprising: the UE receiving (s802) information transmitted by a base station, wherein the information configures the UE to expect to receive a PDSCH transmission in a particular slot; and during the particular slot, the UE decoding (s804) an SPS release command transmitted by the base station, the SPS release command for releasing an active configured SPS.

B1a. The method of embodiment B1, further comprising, after decoding the SPS release command, the UE determining (s806), based on a rule, whether to send to the base station i) an acknowledgment for the SPS release command or ii) an acknowledgment for the PDSCH transmission.

B2. The method of embodiment B1a, wherein the rule specifies that the SPS release command has higher priority than the PDSCH transmission, and the method further comprises the UE using an acknowledgement resource associated with the PDSCH transmission to transmit to the base station a positive acknowledgement for the SPS release command regardless of whether or not the UE was able to decode the PDSCH transmission.

B3. The method of embodiment B1a, wherein the rule specifies that the SPS release command has lower priority than the PDSCH transmission, and the method further comprises the UE using an acknowledgement resource associated with the PDSCH transmission to transmit to the base station an acknowledgement for the PDSCH transmission regardless of whether or not the UE was able to decode the SPS release command.

B4. The method of any one of embodiments B1-B3, wherein the information configures the UE to expect to receive a PDSCH transmission in a particular sub-slot of the particular slot.

B5. The method of embodiment B4, wherein the UE receives the SPS release command during the particular sub-slot or during another sub-slot of the particular slot.

B6. The method of any one of embodiments B1-B5, wherein the method further comprises the receiving configuration information for configuring the UE for SPS, and the information comprises an SPS activation command for activating the SPS configuration.

B7. The method of any one of embodiments B1-B6, wherein the information comprises a dynamic grant.

C1. A method (850) performed by a user equipment, UE, the method comprising: the UE indicating a capability to receive a semi-persistent scheduling (SPS) release command in a slot in which the UE is configured to receive a PDSCH transmission; and the UE receiving an SPS release command in a slot in which the UE is configured to receive a PDSCH transmission.

C2. The method of embodiment C1, wherein the UE receives the SPS release command at least X time-units before an HARQ-ACK codebook, and the method further comprises the UE using the HARQ-ACK codebook to acknowledge SPS release command.

D1. A computer program (943) comprising instructions (944) which when executed by processing circuitry (902) causes the processing circuitry (902) to perform the method of any one of embodiments A1-A10.

D2. A computer program (1043) comprising instructions (1044) which when executed by processing circuitry (1002) causes the processing circuitry (1002) to perform the method of any one of embodiments B1-B7.

D3. A computer program (1043) comprising instructions (1044) which when executed by processing circuitry (1002) causes the processing circuitry (1002) to perform the method of any one of embodiments C1-C2.

D4. A carrier containing the computer program of embodiment D1, D2, or D3, wherein the carrier is one of an electronic signal, an optical signal, a radio signal, and a computer readable storage medium (942, 1042).

D1. A base station (104), the base station being adapted to perform the method of any one of embodiments A1-A10.

D2. A base station (104), the base station comprising: processing circuitry (902); and a memory (942), said memory containing instructions (944) executable by said processing circuitry, whereby said apparatus is operative to perform the method of any one of the embodiments A1-A10.

E1. A UE (102), the UE being adapted to perform the method of any one of embodiments B1-B7 or C1-C2.

E2. A UE (102), the base station comprising: processing circuitry (1002); and a memory (1042), said memory containing instructions (1044) executable by said processing circuitry, whereby said apparatus is operative to perform the method of any one of the embodiments B1-B7 or C1-C2.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] R1-2001382, Summary of email discussion [100e—NR-L1enh_URLLC_SPS_enh-01] on remaining issues on SPS PDSCH Collision, LG Electronics.
[2] R1-2001383, Summary of email discussion [100e—NR-L1enh_URLLC_SPS_enh-02] on remaining issues on HARQ-ACK feedback for DL SPS, LG Electronics.

The invention claimed is:

1. A method performed by a base station for transmitting to a user equipment (UE) configured for semi-persistent scheduling (SPS) an SPS release command for releasing the configured SPS, the method comprising:
transmitting to the UE the SPS release command in a slot in which the UE expects to receive a physical downlink shared channel (PDSCH) transmission for the configured SPS, wherein
transmitting the SPS release command comprises transmitting the SPS release command such that the SPS release command is received by the UE before the end of the PDSCH transmission in the slot.

2. The method of claim 1, further comprising receiving a hybrid automatic repeat request (HARQ) negative acknowledgement (NACK) transmitted by the UE using an acknowledgement resource associated with the expected PDSCH transmission.

3. The method of claim 2, further comprising, as a result of receiving the NACK, the base station transmitting to the UE a second SPS release command for releasing the configured SPS.

4. The method of claim 1, further comprising receiving a hybrid automatic repeat request (HARQ) positive acknowledgement (ACK) transmitted by the UE using an acknowledgement resource associated with the expected PDSCH transmission, wherein the base station interprets the ACK as indicating that the UE has successfully decoded the SPS release command.

5. The method of claim 1, wherein the base station determines whether the UE is capable to receive a) an SPS release command for releasing the configured SPS and b) a PDSCH transmission for the configured SPS in the same slot based on information about a configuration or capability of the UE.

6. A method performed by a user equipment (UE) configured for receiving semi-persistent scheduling (SPS) and further configured to receive a physical downlink shared channel (PDSCH) transmission in a particular slot, the method comprising:
the UE expecting to receive in the particular slot the PDSCH transmission in a resource of the configured SPS; and
the UE receiving the SPS release command before the end of the resource in which the UE expects to receive the PDSCH transmission.

7. The method of claim 6, further comprising:
after decoding the SPS release command, the UE determining, based on a rule, whether to send to the base station i) an acknowledgment for the SPS release command or ii) an acknowledgment for the PDSCH transmission.

8. The method of claim 7, wherein
the rule specifies one of:
that the SPS release command has higher priority than the PDSCH transmission, and
the method further comprises the UE using an acknowledgement resource associated with the PDSCH transmission to transmit to the base station a positive acknowledgement for the SPS release command regardless of whether or not the UE was able to decode the PDSCH transmission; and
that the SPS release command has lower priority than the PDSCH transmission, and
the method further comprises the UE using an acknowledgement resource associated with the PDSCH transmission to transmit to the base station an acknowledgement for the PDSCH transmission regardless of whether or not the UE was able to decode the SPS release command.

9. The method of claim 6, wherein the information comprises a dynamic grant.

10. The method of claim 6, further comprising transmitting a hybrid automatic repeat request (HARQ) negative acknowledgement (NACK) using an acknowledgement resource associated with the expected PDSCH transmission.

11. The method of claim 10, further comprising, after transmitting the NACK, decoding a second SPS release command for releasing the configured SPS.

12. The method of claim 6, further comprising:
successfully decoding the SPS release command; and
as a result of successfully decoding the SPS release command, transmitting a hybrid automatic repeat request (HARQ) positive acknowledgement (ACK) using an acknowledgement resource associated with the expected PDSCH transmission.

13. The method of claim 6, further comprising:
the UE indicating a capability to receive an SPS release command in a slot in which the UE is configured to receive a PDSCH for a configured SPS transmission.

14. A non-transitory computer readable storage medium storing a computer program comprising instructions which when executed by processing circuitry of a base station causes the base station to perform the method of claim 1.

15. A base station for transmitting to a user equipment (UE) configured for semi-persistent scheduling (SPS) an SPS release command for releasing the configured SPS, the base station comprising:
a transmitter; and
processing circuitry, wherein the base station is configured to perform a method comprising:
transmitting to the UE the SPS release command in a slot in which the UE expects to receive a physical downlink shared channel (PDSCH) transmission for the configured SPS, wherein
transmitting the SPS release command comprises transmitting the SPS release command such that the SPS release command is received by the UE before the end of the PDSCH transmission in the slot.

16. The base station of claim 15, further being configured to use an acknowledgement resource associated with the expected PDSCH transmission to receive a hybrid automatic repeat request (HARQ) negative acknowledgement (NACK) transmitted by the UE.

17. A user equipment (UE) configured for semi-persistent scheduling (SPS) and configured to receive a physical downlink shared channel (PDSCH) transmission in a particular slot, the UE comprising:
a receiver; and
processing circuitry, wherein the UE is configured to:
expect to receive in the particular slot the PDSCH transmission in a resource of a configured SPS; and
receive an SPS release command before the end of the resource in which the UE expects to receive the PDSCH transmission.

18. The UE of claim 17, further being configured to, after decoding the SPS release command, determine, based on a rule, whether to send to the base station i) an acknowledgment for the SPS release command or ii) an acknowledgment for the PDSCH transmission.

* * * * *